United States Patent [19]

Fujimura et al.

[11] Patent Number: 5,277,377
[45] Date of Patent: Jan. 11, 1994

[54] SEAT BELT RETRACTOR

[75] Inventors: Yoshiichi Fujimura, Shiga, Japan; Henry Hanna, Armagh, Ireland

[73] Assignee: Takata Corporation, Tokyo, Japan

[21] Appl. No.: 859,926

[22] Filed: Mar. 30, 1992

[30] Foreign Application Priority Data

Apr. 11, 1991 [JP] Japan ................... 3-079143

[51] Int. Cl.$^5$ ................... B60R 22/38; B60R 22/40
[52] U.S. Cl. ................... 242/107.4 A; 242/107.4 B
[58] Field of Search ... 242/107.4 A, 107.4 B, 107.4 C; 280/806; 297/478, 480

[56] References Cited

U.S. PATENT DOCUMENTS 4,099,685  7/1978  Paitula ................... 242/107.4 A X
4,277,036  7/1981  Seifert et al. ................... 242/107.4 A

FOREIGN PATENT DOCUMENTS 109021  5/1984  European Pat. Off. .
243883  11/1987  European Pat. Off. .
827105  2/1960  United Kingdom .
1118438  7/1968  United Kingdom .

Primary Examiner—John M. Jillions
Attorney, Agent, or Firm—Armstrong, Westerman, Hattori, McLeland & Naughton

[57] ABSTRACT

In a seat belt retractor according to the present invention, lock actuating means is actuated to engage locking pins with the engagement portion of a frame when deceleration in excess of a predetermined value acts upon the vehicle and/or when the seat belt is pulled at an acceleration in excess of a predetermined value. Reliable engagement is achieved since the engagement portion of the frame is engaged by the locking pins, unlike the prior art which is adapted to mesh the teeth on a reel shaft with the teeth on a frame. Accordingly, the reel shaft is assuredly locked against turning in the seat belt pulling direction, as a result of which reliability is enhanced.

7 Claims, 16 Drawing Sheets (a)

(b)

(c)

(a)

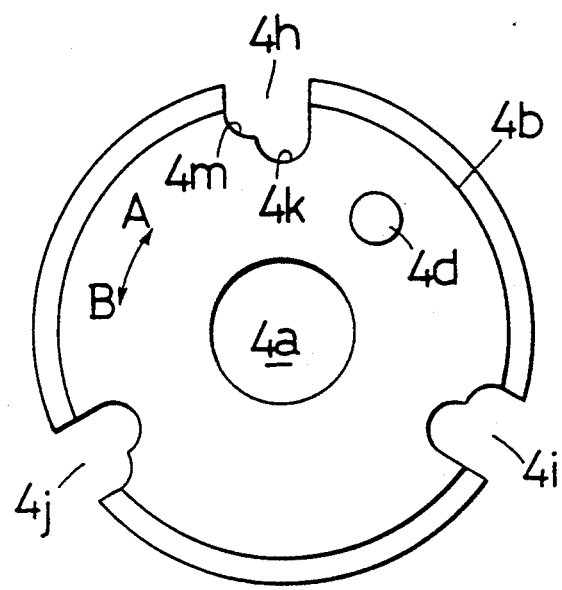
(b)
F I G . 6
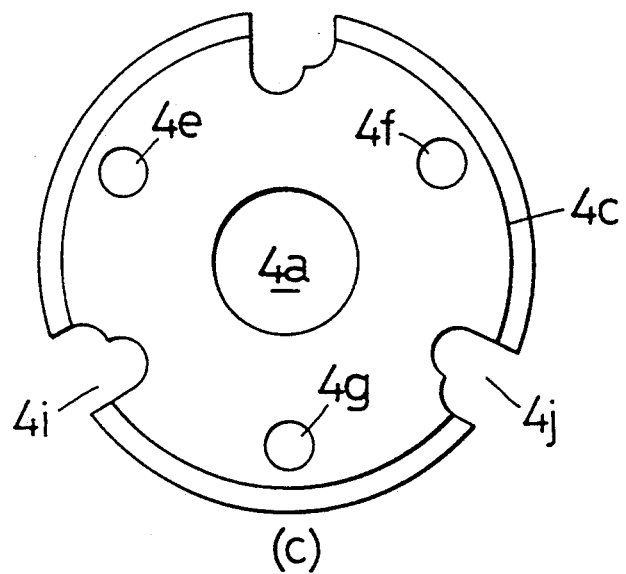
(c)
F I G . 6

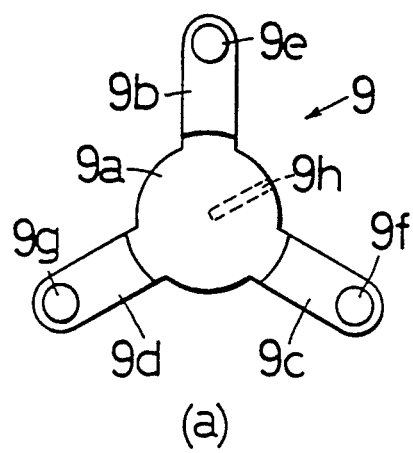
(a)
F I G . 7
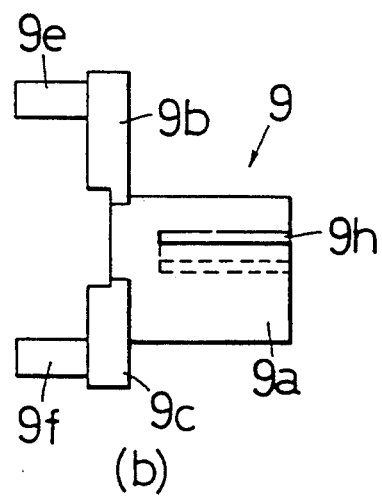
(b)
F I G . 7

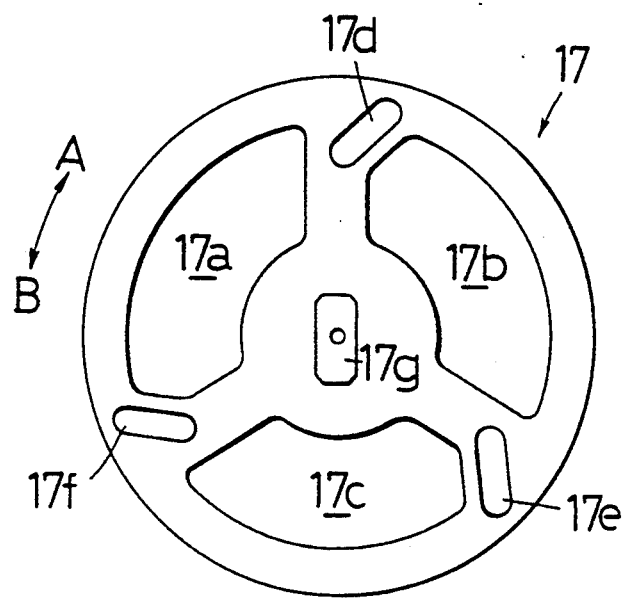
(a)
F I G . 1 0
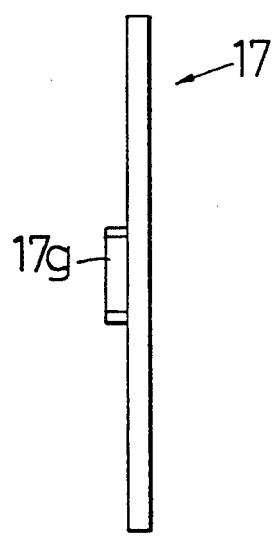
(b)
F I G . 1 0

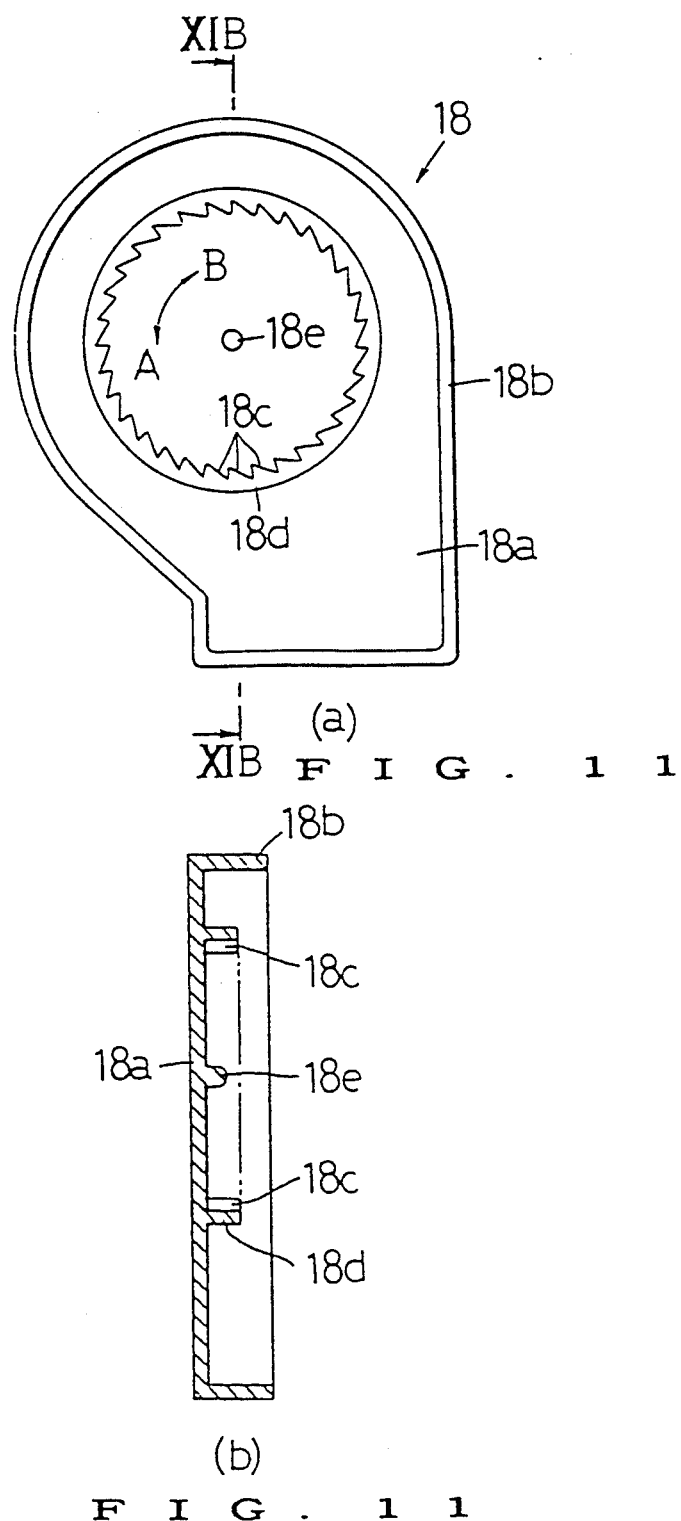

(a)

(b)

SEAT BELT RETRACTOR

BACKGROUND OF THE INVENTION

This invention relates to a seat belt apparatus installed in a vehicle such as an automobile for protecting a passenger. More particularly, the invention relates to a seat belt retractor for locking a reel shaft, which takes up the seat belt, against rotation in the event of an emergency to prevent the seat belt from being pulled off the reel shaft.

In order to prevent a seat belt from being pulled off a reel shaft by inertial motion of a passenger in the event of an emergency such as when a large deceleration acts upon the vehicle, the conventional seat belt retractor installed in a vehicle such as an automobile is provided with locking means for locking the reel shaft, which takes up the seat belt, against rotation.

One example of such reel-shaft locking means is as disclosed in the specification and drawings of U.S. Pat. No. 4,796,918. Specifically, frame locking-type locking means is disclosed in which teeth are formed on a reel shaft and on a frame supporting the reel shaft. When deceleration greater than a predetermined value acts upon the vehicle, the reel shaft moves so that its teeth mesh with the teeth on the frame, thereby locking the reel shaft against rotation. This frame locking-type locking means can be formed so as to be comparatively light in weight because the teeth are formed on the frame and therefore a special member having such teeth is unnecessary. Accordingly, such locking means is fully capable of lending itself to a reduction in weight presently demanded in vehicles such as automobiles.

In a retractor equipped with such locking means, the teeth provided on the reel shaft and the teeth on the frame are each subjected to a comparatively large force when the teeth on the reel shaft mesh with the teeth on the frame. This makes it necessary to form these teeth to have a large width so as to mitigate the stress which they develop. Accordingly, a measure taken in the prior art to mitigate the stress developed by these teeth is to enlarge the thickness of the teeth on the reel shaft and the plate thickness of the frame so as to increase the meshing width of the teeth, or to reinforce the frame by attaching to it teeth formed on a separate member. However, a problem encountered with the former measure is an increase in weight. With the latter measure, the need for a reinforcing member not only results in a large number of parts but also necessitates steps for attaching the reinforcing member, thereby increasing the labor required and raising cost.

Furthermore, in the frame locking-type locking means described above, teeth provided on both ends of the reel shaft must be meshed simultaneously with teeth provided on both the right and left sides of the frame. In actuality, however, it is difficult to effect meshing simultaneously on both the right and left sides, and meshing often takes place on one side only. In particular, since the teeth on the reel shaft and the teeth on the frame mesh owing to movement of the reel shaft, achieving simultaneous engagement on both the right and left sides is very difficult. In addition, in a case where the teeth mesh on one side only, stress concentrates in the meshing teeth and much greater strength is required as a result. The inevitable consequence is a retractor of large size and weight.

Moreover, since the arrangement is such that the reel shaft is allowed to move, the retractor mechanism is extremely complicated.

SUMMARY OF THE INVENTION

An object of the present invention is to provide a seat belt retractor in which reliability is improved by making it possible to lock the reel shaft against rotation with certainty by engaging it with the frame in a reliable manner.

Another object of the present invention is to provide a compact, light-weight seat belt retractor in which the mechanism can be simplified and cost reduced by facilitating assembly.

According to the present invention, the foregoing objects are attained by providing a seat belt retractor comprising a reel shaft for taking up a seat belt, a frame for freely rotatably supporting the reel shaft, locking means disposed between the frame and the reel shaft for allowing the reel shaft to turn when ordinary conditions prevail and for being actuated when necessary to lock the reel shaft against turning at least in a pulling direction of the seat belt, deceleration sensing means actuated when deceleration in excess of a predetermined value acts upon a vehicle, and lock actuating means for actuating the locking means in response to actuation of the deceleration sensing means, characterized in that the locking means comprises a locking pin supported on the reel shaft, and an engagement portion provided on the frame for being engaged by the locking pin, and the locking pin is set at a non-engaging position at which it is remote from the engagement portion of the frame when ordinary conditions prevail and is set at an engaging position at which it engages the engagement portion of the frame when the lock actuating means is actuated, the reel shaft being locked against turning at least in the pulling direction of the seat belt when the locking pin has been set at the engaging position.

The seat belt retractor of the present invention is further characterized by provision of seat belt pull-out sensing means actuated when the seat belt is pulled out at an acceleration in excess of a predetermined value, the lock actuating means being actuated also in response to actuation of the seat belt pull-out sensing means.

According to another aspect of the present invention, the foregoing objects are attained by providing a seat belt retractor comprising a reel shaft for taking up a seat belt, a frame for freely rotatably supporting the reel shaft, locking means disposed between the frame and the reel shaft for allowing the reel shaft to turn when ordinary conditions prevail and for being actuated when necessary to lock the reel shaft against turning at least in a pulling direction of the seat belt, seat belt pull-out sensing means actuated when the seat belt is pulled out at an acceleration in excess of a predetermined value, and lock actuating means for actuating the locking means in response to actuation of the seat belt pull-out sensing means, characterized in that the locking means comprises a locking pin supported on the reel shaft, and an engagement portion provided on the frame for being engaged by the locking pin, and the locking pin is set at a non-engaging position at which it is remote from the engagement portion of the frame when ordinary conditions prevail and is set at an engaging position at which it engages the engagement portion of the frame when the lock actuating means is actuated, the reel shaft being locked against turning at least in the pulling direction of the seat belt when the locking pin has been set at the engaging position.

The seat belt retractor of the present invention is further characterized by provision of two or more of the locking pins.

The seat belt retractor of the present invention is further characterized in that the frame is formed to have a circular hole through which the locking pin is passed, and the engagement portion of the frame is composed of a prescribed number of recesses formed along the entire inner circumferential surface of the circular hole.

The seat belt retractor of the present invention is further characterized in that the recesses each have an arcuate shape.

The seat belt retractor of the present invention is further characterized in that the reel shaft is formed to have an axially directed groove, and the locking pin is disposed in the groove.

The seat belt retractor of the present invention is further characterized in that the groove has a comparatively deep bottom portion and a comparatively shallow bottom portion, and the locking pin is set at the non-engaging position when it is in the comparatively deep bottom portion and at the engaging position when it is in the comparatively shallow bottom portion.

The seat belt retractor of the present invention is further characterized in that the lock actuating means has cam means for guiding the locking pin to the non-engaging position or engaging position.

In the operation of the seat belt retractor of the invention constructed as set forth above, the lock actuating means is actuated to engage the locking pin with the engagement portion of the frame when deceleration in excess of the predetermined value acts upon the vehicle and/or when the seat belt is pulled at an acceleration in excess of the predetermined value. In such case, reliable engagement is achieved since the engagement portion of the frame is engaged by the locking pin, as opposed to the prior-art arrangement in which the teeth on the reel shaft and the teeth on the frame mesh. Accordingly, the reel shaft is assuredly locked against turning in the seat belt pulling direction, as a result of which reliability is enhanced. In particular, since the reel shaft can be locked relative to the frame without being moved, an even greater improvement is reliability is attained.

In addition, because engagement is achieved between the locking pin and the engagement portion of the frame, stress produced is much less in comparison with that developed owing to the conventional meshing between teeth. Accordingly, frame thickness need not be made as great and the reel shaft can be reduced in size. As a result, the retractor can be made small in size and light in weight as well.

Furthermore, since the locking pin alone moves without any movement whatsoever of the reel shaft, the mechanism is simplified and the parts are fewer in number so that assembly labor is reduced and cost lowered.

In particular, providing a plurality of the locking pins as in the present invention raises the certainty of engagement even further and alleviates stress.

Further, by forming the engagement portion of the frame to have the recesses, as in the present invention, the structure is simplified and manufacture facilitated. In particular, it is easier for the locking pin to engage by forming the recesses to be arcuate in shape.

By supporting the locking pin in the axially extending groove formed in the reel shaft, as in the present invention, the locking pin is capable of being held in an accurate, stable attitude at all times. As a result, the engagement between the locking pin and the engagement portion of the frame is made more certain. In particular, the setting of non-engaging and engaging positions of the locking pin by the depth of the groove as recited in claim 8 of the claims makes it possible to simplify the structure for setting the engagement and disengagement of the locking pin.

Furthermore, by arranging it so that the locking pin is moved under the guidance of the cam means, as in the present invention, the engagement and disengagement of the locking pin can be set accurately and through a simple structure.

Still other objects and advantages of the invention will in part be obvious and will in part be apparent from the specification.

The invention accordingly comprises the features of construction, combinations of elements and arrangement of parts which will be exemplified in the construction hereinafter set forth, and the scope of the invention will be indicated in the claims.

BRIEF DESCRIPTION OF THE DRAWINGS

FIGS. 5(a-c) illustrate a frame used in the embodiment, in which FIG. 5(a) is a front view, FIG. 5(b) a side view, and FIG. 5(c) a partial side view as seen from the right in FIG. 5(a);

FIGS. 6(a-c) illustrate a reel shaft used in the embodiment, in which FIG. 6(a) is a front view, FIG. 6(b) a left-embodiment, side view and FIG. 6(c) a right-side view;

FIGS. 7(a) and 7(b) illustrate a bush used in the embodiment, in which FIG. 7(a) is a left-side view and FIG. 7(b) a front view;

FIGS. 8(a-c) illustrate a locking gear used in the embodiment, in which FIG. 8(b) is a left-side view and FIG. 8(c) a right-side view;

FIGS. 10(a) and 10(b) illustrate a cam used in the embodiment, in which FIG. 10(a) is a side view and FIG. 10(b) a front view;

FIGS. 11(a) and 11(b) illustrate a cover used in the embodiment, in which FIG. 11(a) is a right-side view and FIG. 11(b) a sectional view taken along line XIB—XIB of FIG. 11(a); and FIGS. 12(a) and 12(b) are for describing the operation of locking pins used in the embodiment, in which FIG. 12(a) is a diagram showing the locking pins in non-engaging positions and FIG. 12(b) is a diagram showing the locking pins in engaging positions.

DESCRIPTION OF THE PREFERRED EMBODIMENT

Figure 5:
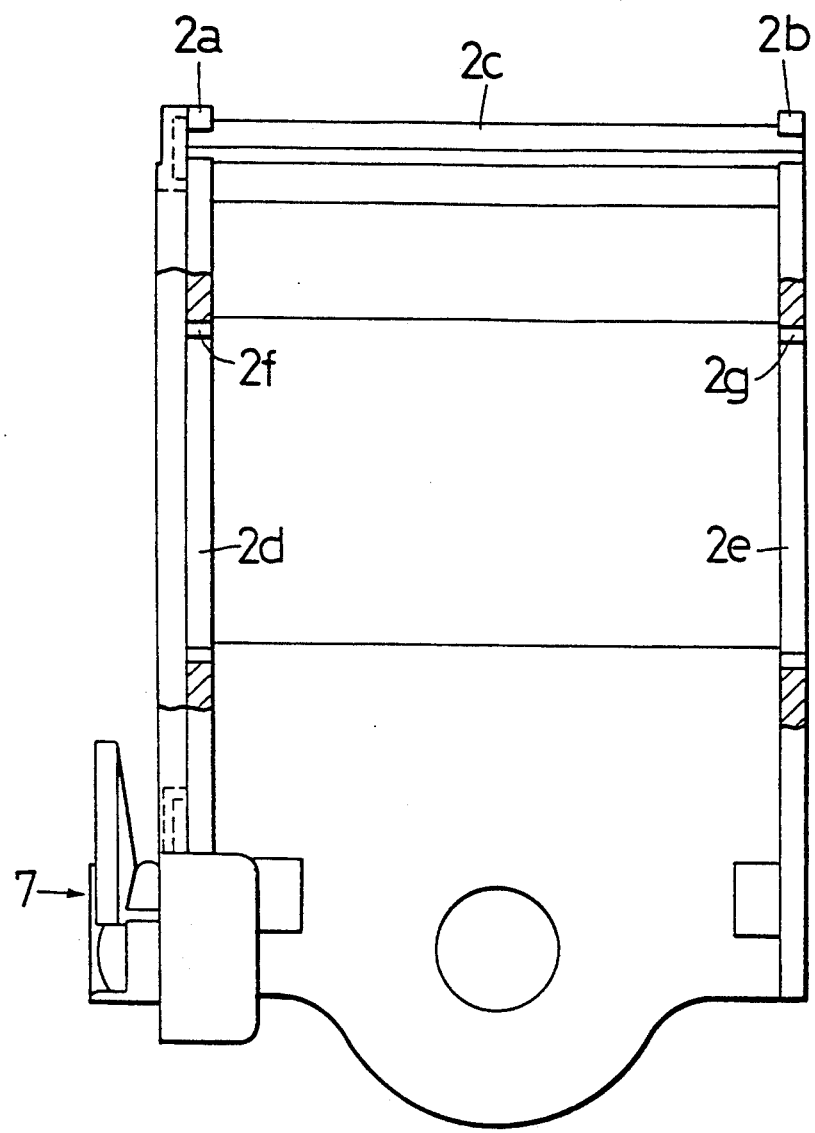
Figure 5:
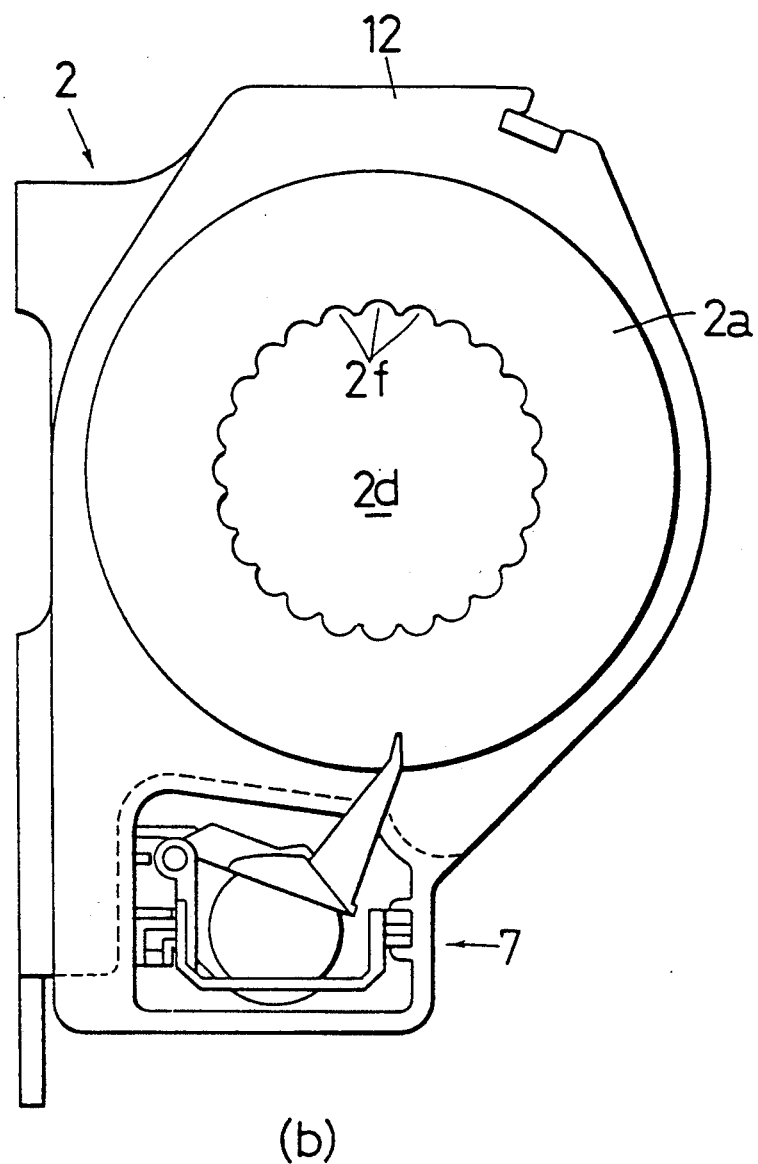
Figure 5:
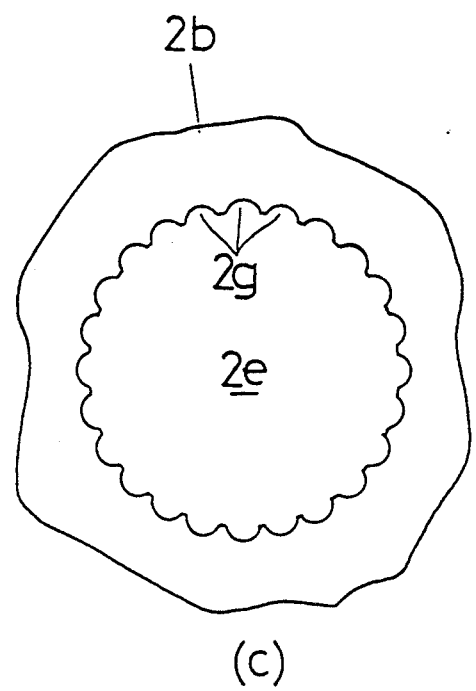

As illustrated in FIGS. 1 through 4, a seat belt retractor 1 according to this embodiment is equipped with a generally U-shaped frame 2 having left and right side walls 2a, 2b. As clearly shown in FIG. 5(a), the left and right side walls 2a, 2b are interconnected by a connecting member 2c, whereby the frame 2 is reinforced. The left side wall 2a is formed to have a circular hole 2d, as illustrated in FIG. 5(b), and the right side wall 2b is formed to have a circular hole 2e, as depicted in FIG. 5(c).

A prescribed number of arcuate recesses 2f, 2g are formed in corrugated fashion over the entire inner circumferential surfaces of the respective holes 2d, 2e in the corresponding left and right side walls 2a, 2b. The recesses 2f, 2g are formed to be identical in number, and the arrangement is such that one recess 2f of the left side wall 2a coincides with its counterpart recess 2g of the right side wall 2b.

Figure 3:
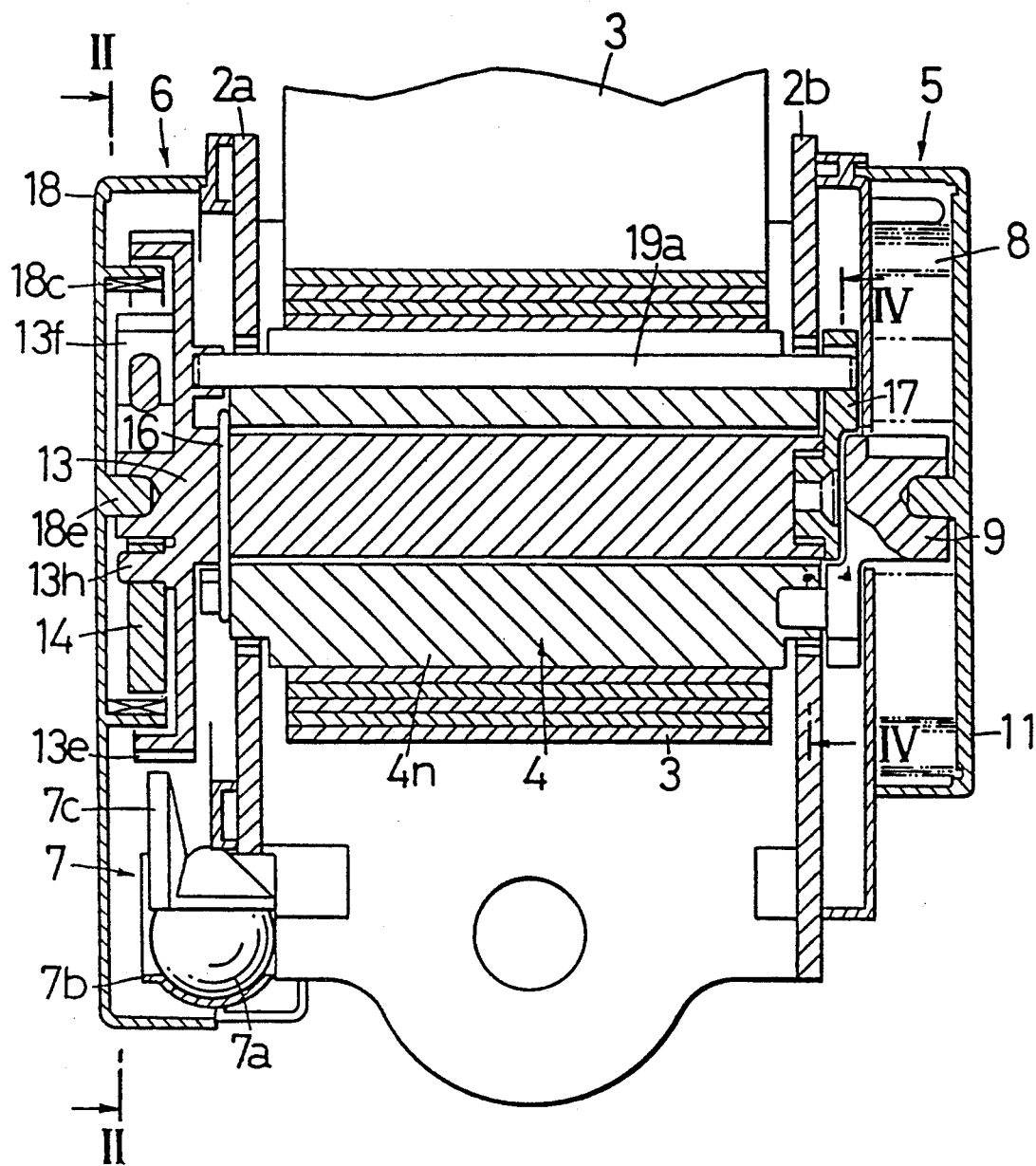
FIG. 3 is a sectional view taken along line III—III of FIG. 2 and showing the seat belt retractor of the embodiment in the assembled state.
Figure 4:
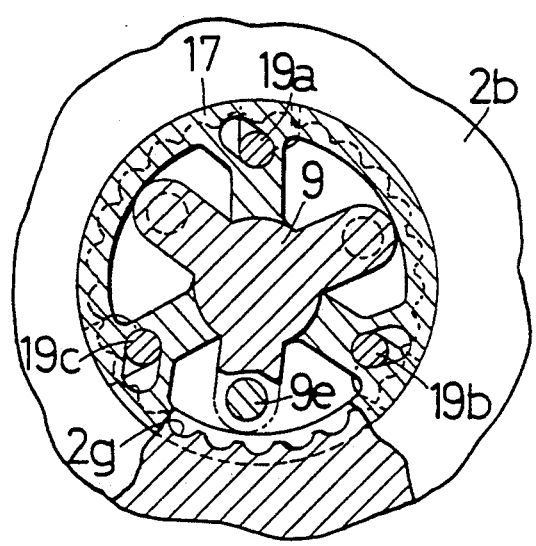
FIG. 4 is a sectional view taken along line IV—IV of FIG. 3 and showing the seat belt retractor of the embodiment in the assembled state.
Figure 6:
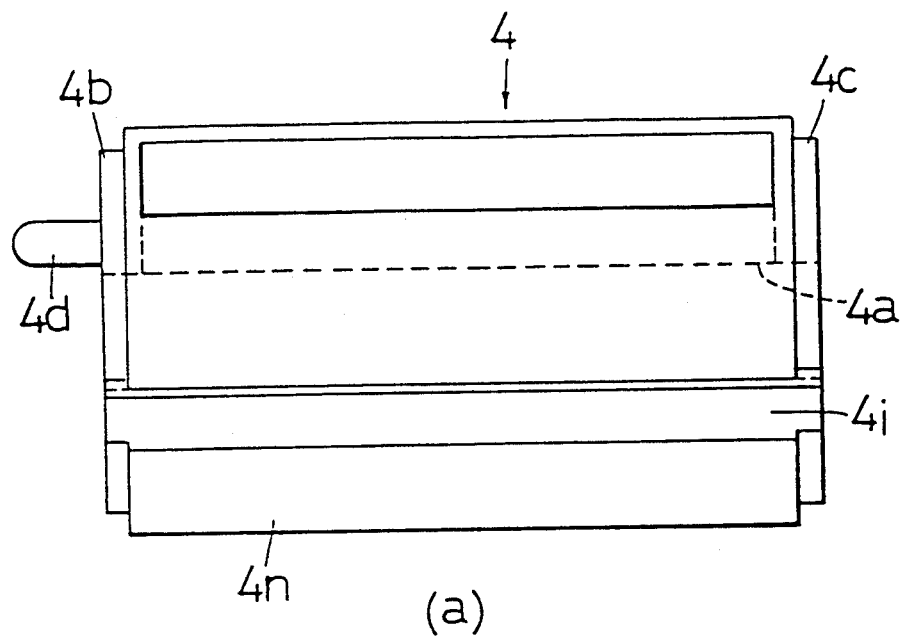

As shown in FIG. 3, a reel shaft 4 for taking up a seat belt 3 is disposed between the left and right side walls 2a, 2b of frame 2. As illustrated in FIG. 6(a), the reel shaft 4 is cylindrically formed and is provided with a through-hole 4a along its central axis. Both end portions of the reel shaft 4 are reduced in diameter to form small-diameter portions 4b, 4c. The left side face (the face on the side of the left side wall 2a of the frame) of the reel shaft 4 is provided with a projection 4d protruding in the axial direction, as depicted in FIG. 6(b). The right side face (the face on the side of the right side wall 2b of the frame) of the reel shaft 4 is formed to have three holes 4e, 4f, 4g spaced apart equidistantly in the circumferential direction, as shown in FIG. 6(c).

Further, the outer peripheral surface of the reel shaft 4 is formed to having three axially extending grooves 4h, 4i, 4j spaced apart equidistantly in the circumferential direction. The bottom of groove 4h comprises a semicircular arcuate portion 4k and an arcuate portion 4m which defines one quarter of a circle, as depicted in FIG. 6(b). In this case the semicircular arcuate portion 4k is formed to be deeper than the quarter-circle arcuate portion 4m. The arrangement is such that the semicircular arcuate portion 4k is situated on a side that is in the pulling direction A of the seat belt 3. The bottom of each of the other grooves 4i, 4j is formed in the same manner as the bottom of groove 4h. As illustrated in FIG. 3, the reel shaft 4 is formed to have a take-up portion 4n situated between the left and right side walls 2a, 2b of the frame 2, and the small-diameter portions 4b, 4c are situated in the holes 2d, 2e of the left and right side walls 2a, 2b.

Biasing means 5 which subjects the reel shaft 4 to a force for taking up the seat belt 3 is attached to the right side wall 2b. Seat-belt lock actuating means 6 is attached to the left side wall 2a, which is provided with deceleration sensing means 7. When a predetermined deceleration acts upon the vehicle, the deceleration sensing means 7 senses this deceleration and actuates the seat-belt lock actuating means 6.

The biasing means 5 comprises a spiral spring 8, a bush 9 to which an inner circumferential end 8a of the spiral spring 8 is connected so as to receive the spring force, a spring case 10 to which an outer circumferential end of the spiral spring 8 is secured, and which accommodates the spiral spring 8, and a cover 11 attached to the spring case 10 to cover the spiral spring 8.

As shown in FIG. 7, the bush 9 has a centrally located shaft portion 9a, three legs 9b, 9c, 9d integrally secured to the left end of the shaft portion 9a and spaced apart equidistantly in the circumferential direction, and axially extending projections 9e, 9f, 9g provided on the respective distal ends of the corresponding legs 9b, 9c, 9d. When the seat belt retractor 1 is assembled, as depicted in FIG. 3. the arrangement is such that the projections 9e, 9f, 9g are fitted into the three holes 4e, 4f, 4g of the reel shaft 4 upon being passed through the respective openings 17a, 17b, 17c (shown in FIG. 10) of a cam, described below. As a result, the spring force of the spiral spring 8 is transmitted to the bush 9 and from the bush 9 to the reel shaft 4.

The shaft portion 9a is formed to have a slit 9h extending from the right end thereof up to the central portion in the axial direction. The inner circumferential end 8a of the spiral spring 8 is inserted into the slit 9h so as to be secured thereto.

The seat-belt lock actuating means 6 comprises a retainer 12 secured to the left side wall 2a, a locking gear 13, an inertial body 14 oscillatably attached to the locking gear 13, a control spring 15 disposed between the locking gear 13 and the inertial body 14, an omega ($\Omega$)-shaped spring 16 disposed between the reel shaft 4 and the locking gear 13, a cam 17 disposed on the side of the right side wall 2b and integrally connected to the locking gear 13, and a cover 18 covering the locking gear 13.

Figure 1:
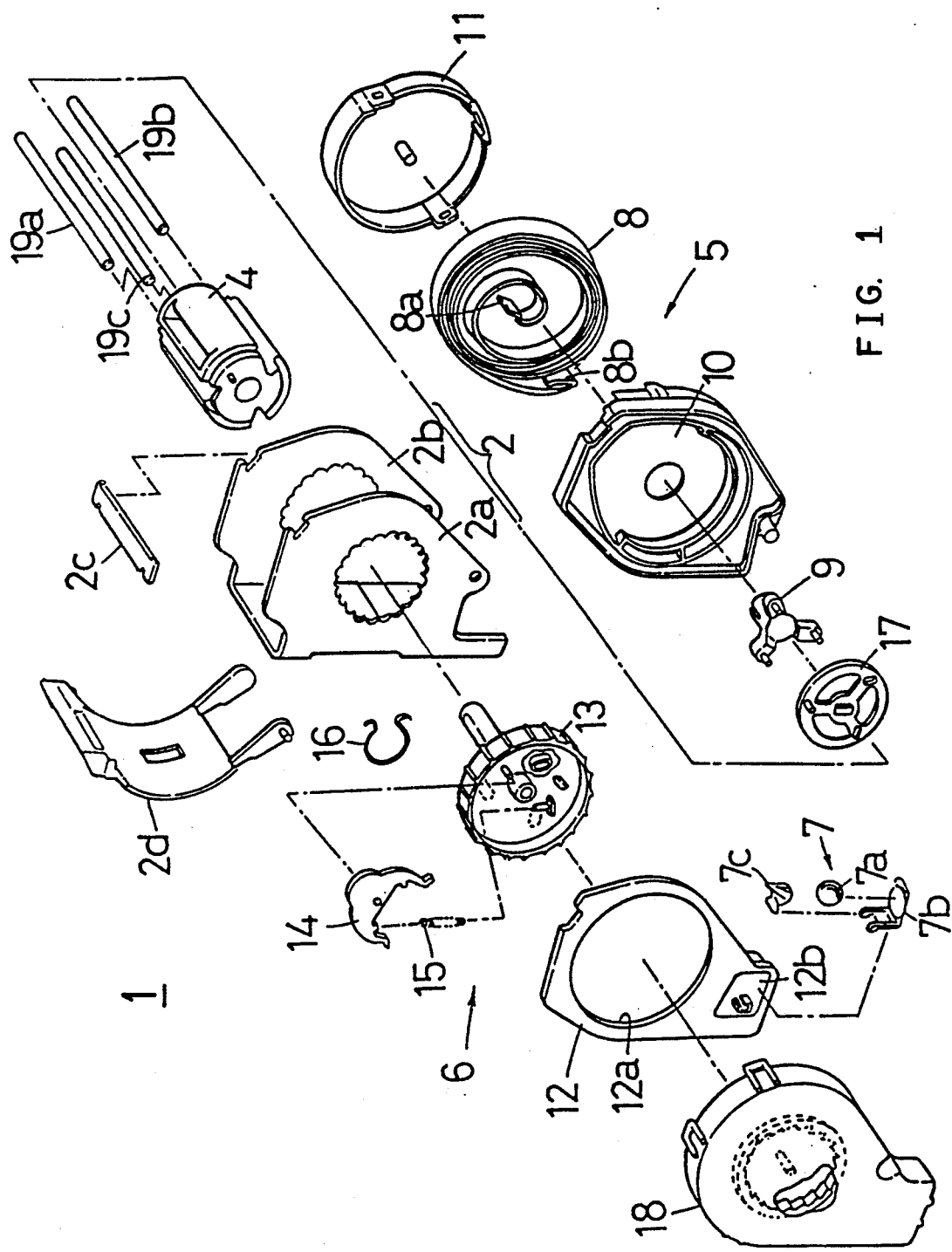
FIG. 1 is an exploded perspective view illustrating an embodiment of a seat belt retractor according to the present invention.

As shown in FIGS. 1, 5(a) and 5(b), the retainer 12 is formed as a flat plate and has a very large hole 12a. The lower portion of the retainer 12 has a mounting portion 12b for mounting the deceleration sensing means 7.

Figure 8A:
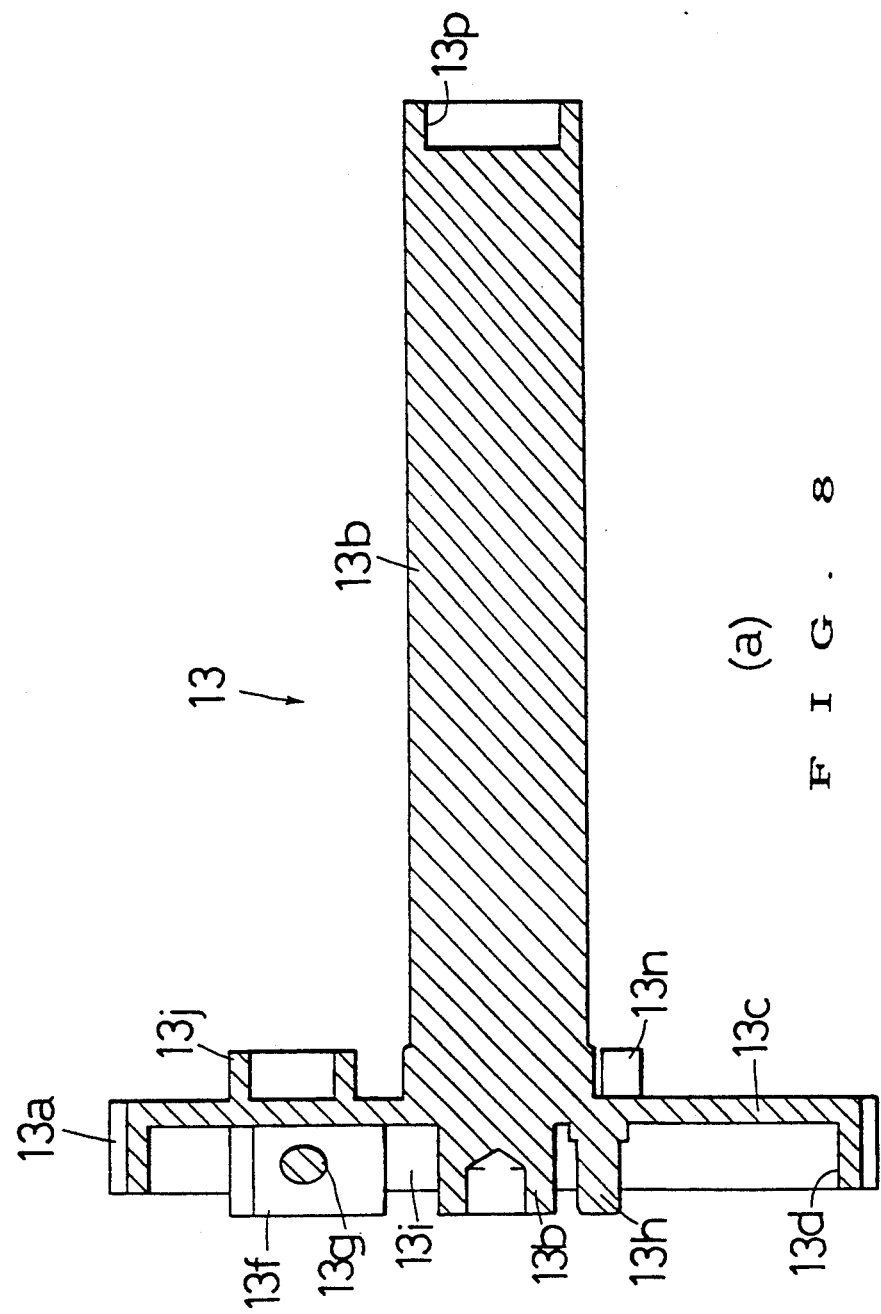
FIG. 8(a) is a sectional view taken along line VIIIA—VIIIA in FIG. 8(b) and FIG. 8(c)
Figure 8:
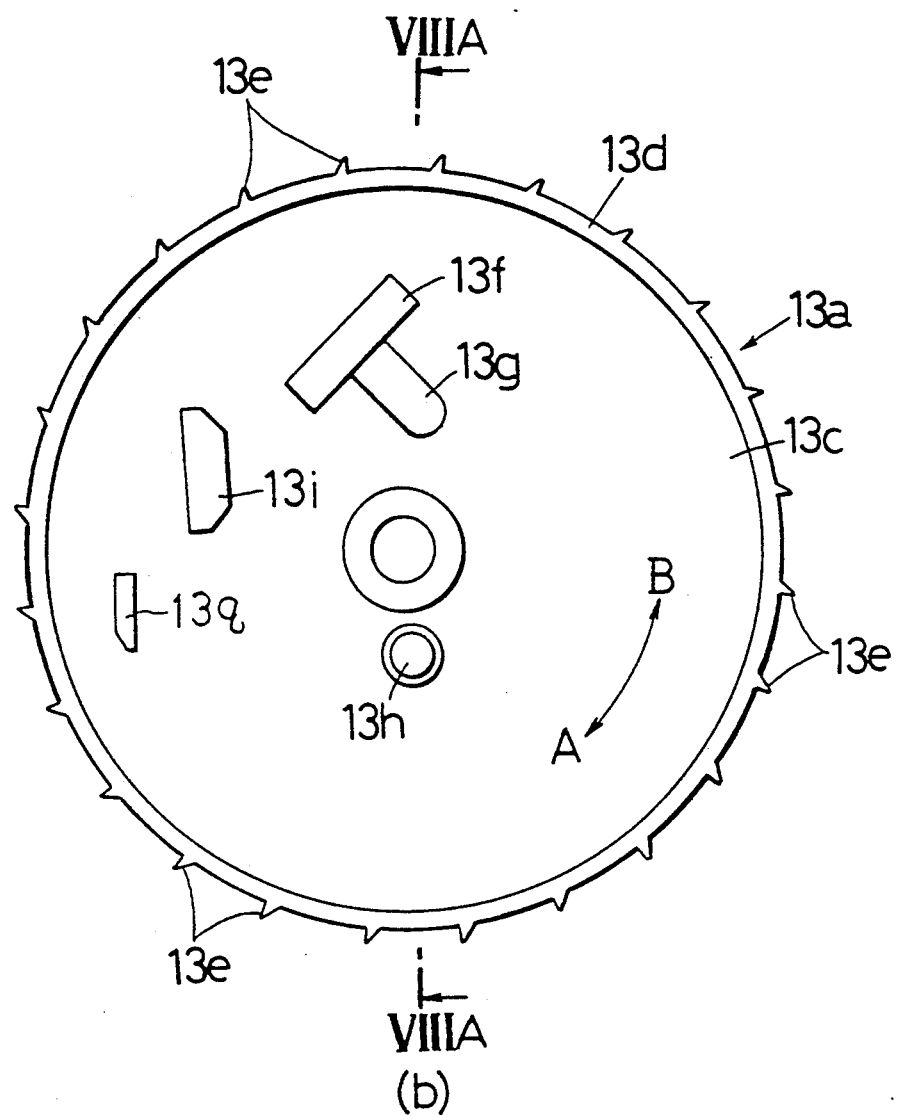
Figure 8:
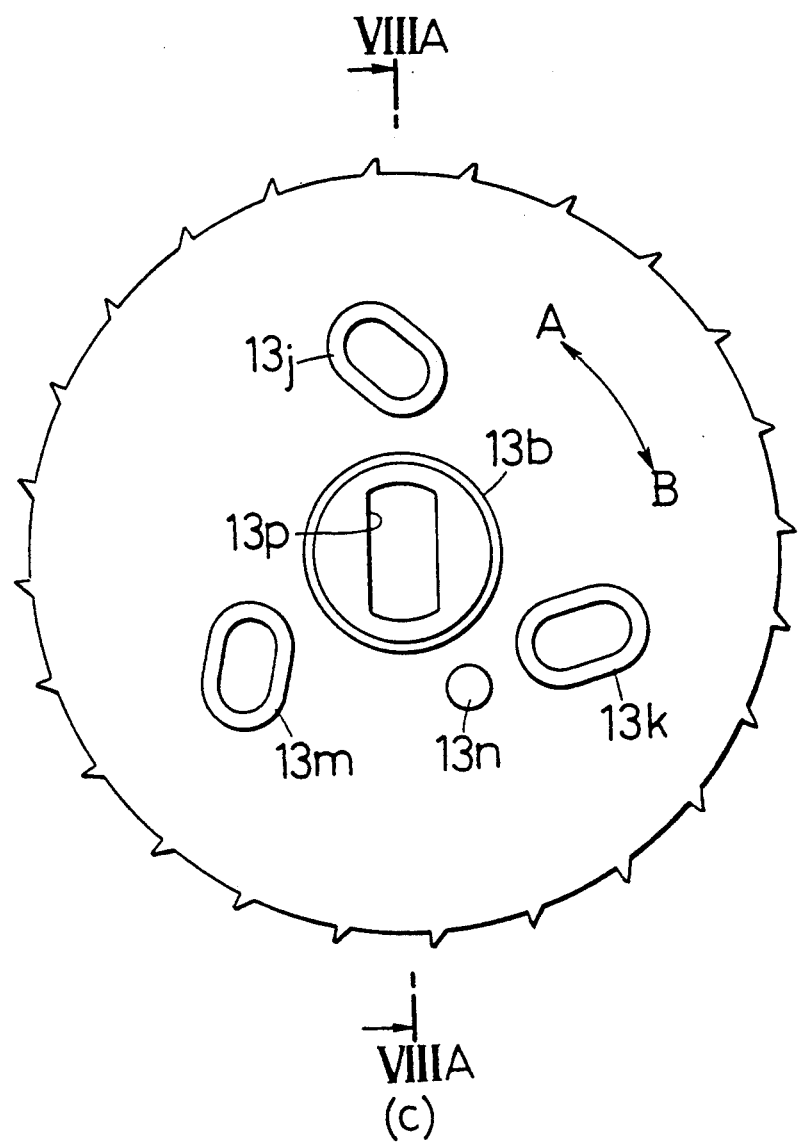

The locking gear 13 comprises a locking gear portion 13a and a shaft portion 13b extending rightward from the central part of the locking gear portion 13a, as illustrated in FIG. 8(a). The locking gear is formed to have a circular flat plate 13c the outer periphery of which is formed to include an annular flange 13d, as depicted in FIG. 8(b). The outer circumferential surface of the flange 13d is formed to have a predetermined number of teeth 13e. Each tooth 13e is triangular in shape. In this case, the tooth face opposing the A direction defines a comparatively gentle slope, while the tooth face opposing the B direction is approximately vertical.

As illustrated in FIG. 8(b), the left side face [in FIG. 8(a)] of the flat plate 13a is provided with an upstanding spring seating member 13f, which in turn is provided with an upstanding spring guide 13g lying parallel to the flat plate 13a. Further, the flat plate 13a is provided with an upstanding shaft 13h, as well as with an upstanding first stopper 13i and an upstanding second stopper 13q.

As illustrated in FIG. 8(c), the right side face [in FIG. 8(a)] of the flat plate 13a is provided with three upstanding, equidistantly spaced oval ring-shaped cam members 13j, 13k, 13m. The inner circumferential surface of each of these cam members 13j, 13k, 13m defines a cam face. The cam members 13j, 13k, 13m are provided so as to be inclined from the inner side to the outer side in the seat belt pulling direction A. The right side face of the flat plate 13 is further provided with an upstanding spring fastening portion 13n.

As illustrated in FIGS. 8(a) and (c), the right end of the shaft portion 13b is formed to have a rectangular recess 13p.

Figure 2:
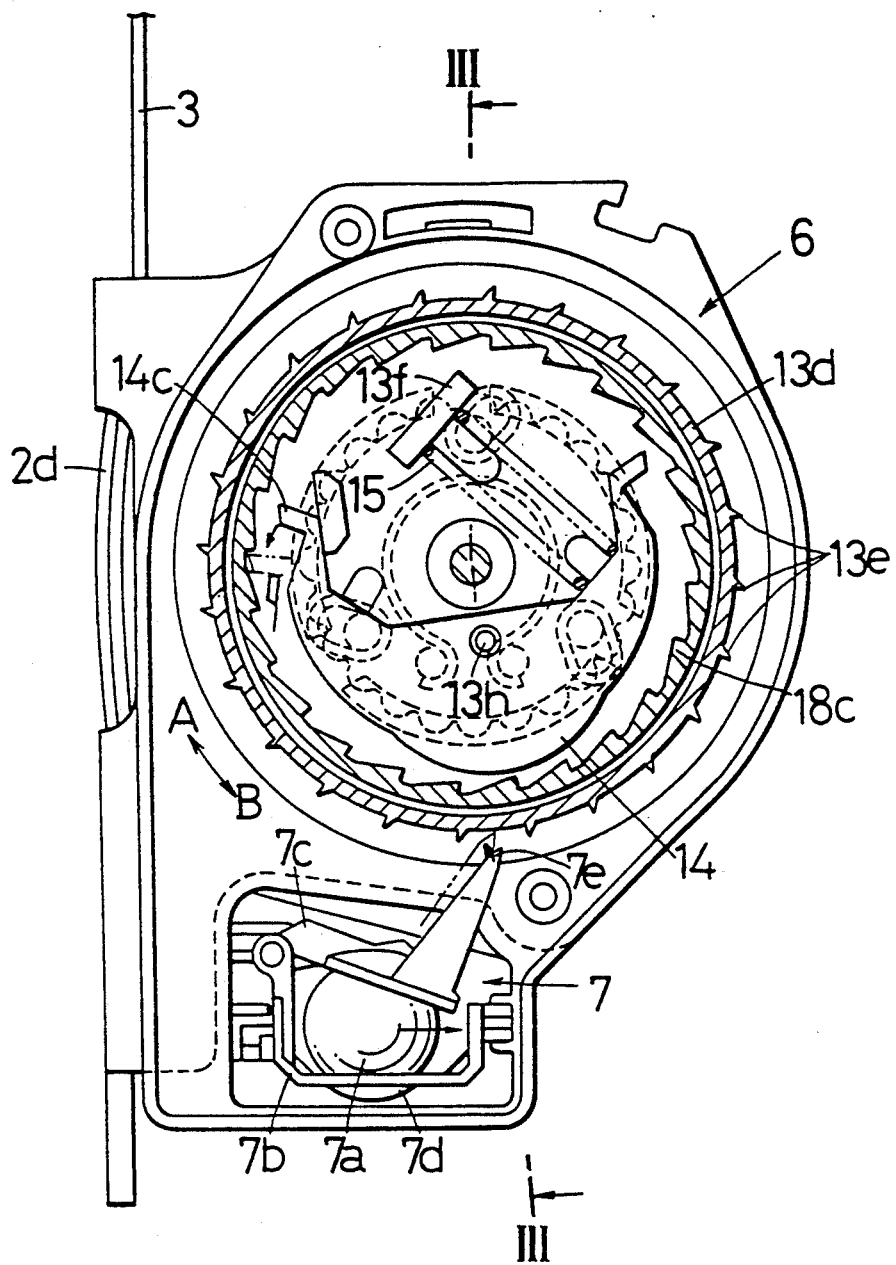
FIG. 2 is a sectional view taken along line II—II of FIG. 3 and showing the seat belt retractor of the embodiment in the assembled state.
Figure 9:
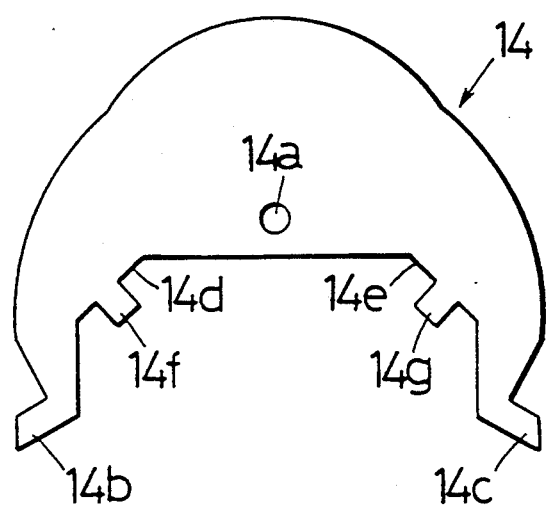
FIG. 9 is a diagram showing an inertial body used in the embodiment.
Figure 1:
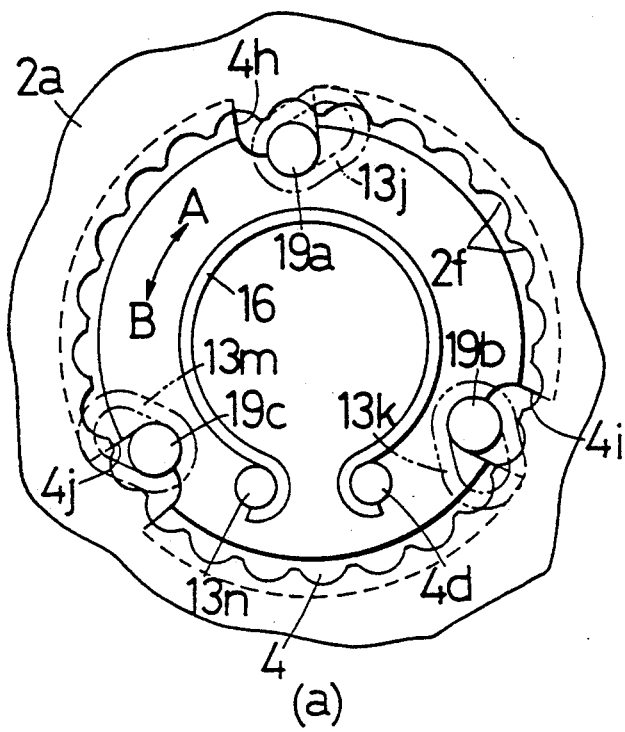
Figure 1:
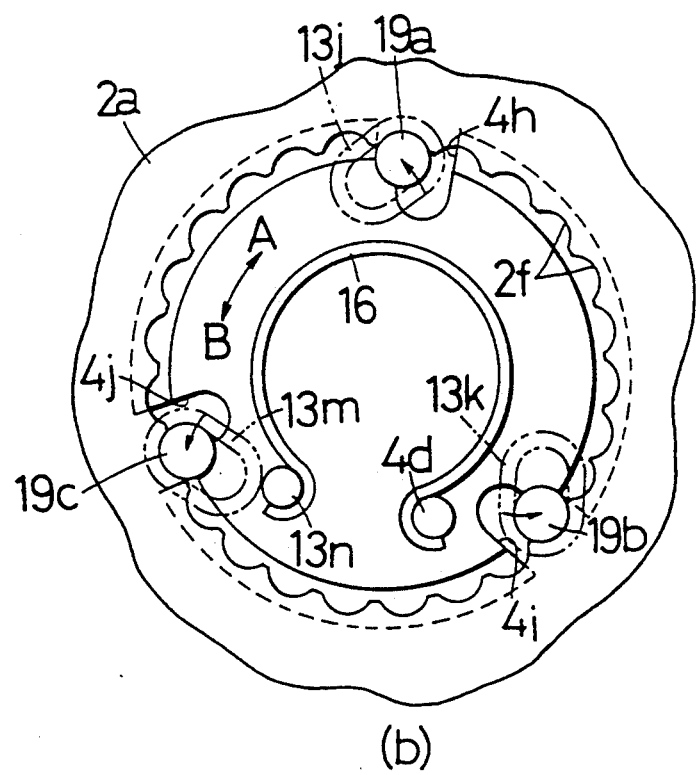

As depicted in FIG. 9, the inertial body 14 is formed into a generally $\Omega$-shaped configuration from a flat plate and is provided with a centrally located hole 14a. The two ends of the inertial body 14 are formed to have respective locking pawls 14b, 14c, and spring seats 14d, 14e and spring guide portions 14f, 14g are provided between the two locking pawls 14b, 14c. As shown in FIG. 2, the inertial body 14 is rockably supported on the locking gear 13 by fitting the shaft 13h of locking gear 13 into the hole 14a. The control spring 15 is fitted onto the guide portions 13g, 14g and is compressed between the spring seating member 13f and spring seat 14e. Owing to the spring force of the control spring 15, the inertial body 14 is biased relative to the locking gear 13 at all times in the A direction. Under ordinary conditions, the inertial body 14 is in abutting contact with the first stopper 13i.

One end of the Ω-shaped spring 16 is fastened to the projection 4d of the reel shaft 4, and the other end thereof is fastened to the projection 13n of the locking gear 13. By virtue of the Ω-shaped spring 16, the locking gear 13 is biased relative to the reel shaft 4 at all times in the seat belt pulling direction A.

As shown in FIG. 10(a), the cam 17 is formed to have a generally plate-shaped configuration and is formed to include there sector-shaped openings 17a, 17b, 17c spaced equidistantly in the circumferential direction. Oval-shaped cam holes 17d, 17e, 17f are provided between mutually adjacent ones of the openings 17a, 17b, 17c. The openings 17a, 17b, 17c are formed so as to have the same size as the cam face of each of the cam members 13j, 13k, 13m of the locking gear 13, and they are provided so as to be inclined from the inner side to the outer side in the seat belt pulling direction A just as the cam members. Furthermore, the central portion of the cam 17 is provided with a rectangularly shaped projection 17g extending in the axial direction.

As illustrated in FIG. 3, the shaft portion 13b of the locking gear 13 is passed through the through-hole 4a of the reel shaft 4, and the projection 17g of the cam 17 is fitted into the recess 13p of the shaft 13b, in which state the cam 17 is integrally secured to the shaft 13b so as to co-rotate with the locking gear 13. In this case, the arrangement is such that the cam faces of the three cam members 13j, 13k, 13m of locking gear 13 and the three cam holes 17d, 17e, 17f of cam 17 are in perfect coincidence in the circumferential direction when viewed from the axial direction.

As shown in FIG. 3, the cover 18 is adapted to cover the locking gear 18, the inertial body 14 and the deceleration sensing means 7 and is removably attached to the retainer 12. As illustrated in FIG. 11, the cover 18 comprises a flat plate portion 18a of a prescribed shape, and a flange portion 18b provided over the entire circumferential edge of the plate portion. The flat plate portion 18a is provided with an annular toothed member 18d formed to have a prescribed number of teeth 18c on its inner circumferential surface. Each tooth 18c is triangular in shape. The tooth face opposing the seat belt pulling direction A is approximately vertical, while the tooth face opposing the seat belt take-up direction B defines a gentle slope.

With the cover 18 in the attached state, the annular toothed member 18d is situated between the flange 13d and the inertial body 14 on the inner side of the flange 13d of locking gear 13, as illustrated in FIG. 3. Under ordinary conditions, as described above, the spring force of the control spring 15 holds the inertial body 14 at a position where it is in abutting contact with the first stopper 13i, and therefore the locking pawl 14c is held at a non-engaging position at which it is remote from the teeth 18c. Further, when the inertial body 14 is rocked or oscillated relative to the locking gear 13 against the spring force of the control spring 15 to be brought into abutting contact with the second stopper 13q, the locking pawl 14c comes to be situated at an engaging position where it is capable of engaging the teeth 18c.

If the locking gear 13 is rotated in the seat belt pulling direction A when the locking pawl 14c is in the engaging position, the locking pawl 14c engages the teeth 18c so that the locking gear 13 is locked against any further rotation in the seat belt pulling direction A. If the locking gear 13 is rotated in the seat belt take-up direction B when the locking pawl 14c is in the engagable position, the locking pawl 14c returns to the position where the inertial body 14 abuts against the first stopper 13i owing to the spring force of the control spring 15. As a result, the locking gear 13 is capable of rotating in the seat belt take-up direction B.

The central portion of the annular toothed member 18d is provided with a projection 18e. When the cover 18 is attached, as depicted in FIG. 3, the projection 18e is fitted into the hole 13j of the locking gear 13, thereby positioning the annular toothed member 18d of the cover 18 accurately with respect to the locking gear 13.

Locking pins 19a, 19b, 19c are disposed in respective ones of the three grooves 4h, 4i, 4j of the reel shaft 4, as shown in FIG. 3. The locking pins 19a, 19b, 19c have one end thereof inserted into holes of the respective cam members 13j, 13k, 13m of the locking gear 13. The other ends of these locking pins are inserted into respective cam holes 17d, 17e, 17f of the cam 17. Accordingly, the three locking pins 19a, 19b, 19c are moved by rotation of the locking gear 13 and cam 17 while being guided by the cam members 13j, 13k, 13m and cam holes 17d, 17e, 17f.

The movement of the locking pins 19a, 19b, 19c will now be described in detail. When the seat belt retractor 1 is in the ordinary operating state, the locking gear 13 and cam 17 are biased in the A direction at all times relative to the reel shaft 4 by the spring force of the Ω-shaped spring 16, as shown in FIG. 12(a). Since the locking gear 13 is turned in the A direction relative to the reel shaft 4 owing to this spring force, the locking pins 19a, 19b, 19c move inward under the guidance of the cam members 13j, 13k, 13m and cam holes 17d, 17e, 17f and are retained at positions where they abut against the deeper semicircular bottom portions of the grooves 4h, 4i, 4j. Since the locking pins 19a, 19b, 19c are incapable of moving inward any further, the locking gear 13 cannot turn any further in the A direction relative to the reel shaft 4. Thus, when the seat belt retractor 1 is in the ordinary operating state, the reel shaft 4, locking gear 13 and locking pins 19a, 19b, 19c are held in the state shown in FIG. 12(a).

When the locking pins 19a, 19b, 19c are in these positions, the locking pins 19a, 19b, 19c are almost completely inserted into the respective grooves 4h, 4i, 4j of the reel shaft 4, and therefore the locking pins 19a, 19b, 19c are in non-engaging positions at which they are remote from the recesses 2f, 2g on the left and right side walls 2a, 2b of frame 2.

When the locking gear 13 is turned relative to the reel shaft in the B direction, the locking pins 19a, 19b, 19c move outward under the guidance of the cam members 13j, 13k, 13m and cam holes 17d, 17e, 17f and are retained at positions where they abut against the shallower quarter-circle bottom portions of the grooves 4h, 4i, 4j, as depicted in FIG. 12(b). When the locking pins 19a, 19b, 19c are in these positions, portions of the locking pins 19a, 19b, 19c escape from the grooves 4h, 4i, 4j and mate with one of the recesses 2f and one of the recesses 2g, thereby occupying an engaging position. Since the remaining portions of the locking pins 19a, 19b, 19c reside in the grooves 4h, 4i, 4j when the locking pins 19a, 19b, 19c are at these positions, the locking gear 13 is locked against any further rotation relative to the reel shaft 4 in the B direction by virtue of the locking pins 19a, 19b, 19c. Thus, the locking pins 19a, 19b, 19c, the grooves 4h, 4i, 4j of the reel shaft 4 and the recesses 2f, 2g construct seat belt locking means.

When the locking pins 19a, 19b, 19c mate with the recesses 2f, 2g of the left and right side walls 2a, 2b, the recesses 2f, 2g are in coincidence in the circumferential direction and the left and right ends of the locking pins are guided simultaneously by the guide members 13j, 13k, 13m and cam holes 17d, 17e, 17f. As a result, the locking pins 19a, 19b, 19c reliably mate with the recesses 2f, 2g at the same time. In particular, since the locking pins 19a, 19b, 19c are held in the correct attitude by the axially directed grooves 4h, 4i, 4j of the reel shaft 4 during ordinary operation, simultaneous engagement with the recesses 2f, 2g takes place with even greater certainty.

As illustrated in FIG. 1, the deceleration sensing means 7 comprises an inertial ball 7a, a support base 17b, for supporting the inertial ball 7a, and an actuator 7c attached to the support base 7b, so as to be capable of being rocked by movement of the inertial ball 7a. As shown in FIG. 2, the support base 7b, is provided with a recess 7d on which the inertial ball 7a is placed. The inertial ball 7a is supported by the recess 7d in such a manner that it will undergo almost no movement under ordinary conditions. When deceleration in excess of a predetermined value acts upon the vehicle, the inertial ball 7a escapes from the recess 7d and moves forwardly as indicated by the arrow in FIG. 2.

The distal end of the actuator 7c is formed to have a locking pawl 7e. Under ordinary conditions, the actuator 7c is in a non-engaging position where it is remote from the teeth 13e of the locking gear 13, as indicated by the solid lines in FIG. 2. When the inertial ball 7a moves to the right in FIG. 2, the actuator 7c is turned upward as indicated by the arrow so that the locking pawl 7e (now indicated by the phantom line) assumes an engaging position where it engages with the teeth 13e. As shown in FIG. 2, the deceleration sensing means 7 also is covered by the cover 18.

The operation of the embodiment constructed as set forth above will now be described.

[Operation under ordinary conditions in which deceleration greater than a predetermined value does not act upon the vehicle]

Under these conditions, the inertial ball 7a of the deceleration sensing means 7 does not move and therefore the actuator 7c resides at the position indicated by the solid line shown in FIG. 2 and the locking pawl 7e resides at the non-engaging position at which it is remote from the teeth 13e of the locking gear 13. Similarly, the locking pawl 14c of the inertial body and the locking pins 19a, 19b, 19c also are at their non-engaging positions, as shown in FIGS. 2 and 3.

Accordingly, mainly the operation performed by the seat belt retractor 1 under these conditions is that of the biasing means 5. In other words, owing to the spring force of the biasing means 5, the reel shaft 4 is biased in the seat belt take-up direction B, as a result of which the seat belt 3 is taken up.

[Operation when the seat belt has not been fastened]

In this state, a tongue (not shown) attached to the seat belt 3 and a buckle member (not shown) are in a separated condition. Accordingly, the state is such that the seat belt 3 is taken up owing to the spring force of the spring 8, as set forth earlier.

[Operation when the seat belt is pulled out]

When the passenger pulls out the seat belt 3 in order to fasten it, this is accompanied by rotation of the reel shaft 4 and bush 9 in the seat belt pulling direction A. As a consequence, the spring 8 is wound up and tightened.

[Operation when passenger's hand is removed from the seat belt after the tongue and buckle member are connected]

When the tongue and buckle member have been connected together by the passenger, the seat belt 3 will have been pulled out by a length in excess of a normal length required to restrain the passenger. Therefore, when the passenger releases the seat belt 3 after the above-described connecting operation, the seat belt 3 is taken up by the spring force of spring 8 until the belt is fitted to the body of the passenger. The spring force of spring 8 is suitably decided in such a manner that the seat belt 3 will not subject the passenger to an oppressive sensation at this time. As long as the vehicle is not subjected to deceleration in excess of a predetermined value, the seat belt retractor 1 maintains this state during travel of the vehicle.

[Operation when deceleration greater than a predetermined value acts upon the vehicle]

When deceleration greater than a predetermined value acts upon the vehicle as a result of, say, emergency braking during vehicle travel, the seat belt lock actuating means 6 and deceleration sensing means 7 both operate. In a first stage of operation, the inertial ball 7a of the deceleration sensing means 7 is moved forwardly (in the direction of the arrow in FIG. 2) owing to deceleration, as a result of which the actuator 7c turns upward to assume the position indicated by the phantom lines in FIG. 2. Consequently, the locking pawl 7e assumes the engaging position. Meanwhile, since the body of the passenger attempts to lunge forwardly due to this vehicle deceleration in excess of the predetermined value, the seat belt 3 is pulled but, in response thereto, the reel shaft 4, locking gear 13 and cam 17 turn in the pulling direction A.

However, because the teeth 13e of locking gear 13 are quickly engaged by the locking pawl 7e, turning of the locking gear 13 and cam 17 in the pulling direction A is soon halted. As a result, only the reel shaft 4 continues to turn in the pulling direction A, and hence relative turning motion against the spring force of the Ω-shaped spring 16 develops between the locking gear 13 and cam 17 on the one hand and the reel shaft 4 on the other. In other words, the locking gear 13 and cam 17 turn relative to the reel shaft 4 in the B direction.

In a second stage of operation, the locking pins 19a, 19b, 19c move from their respective non-engaging positions shown in FIG. 12(a) to their respective engaging positions shown in FIG. 12(b), under the guidance of the cam members 13j, 13k, 13m and cam holes 17d, 17e, 17f, owing to the relative turning motion of the locking gear 13 and cam 17. Owing to the movement of the locking pins 19a, 19b, 19c to their engaging positions, turning of the reel shaft 4 in the seat belt pulling direction A is prevented. As a result, it is possible to reliably prevent pull-out of the seat belt 3 caused by inertial forward lunging movement of the passenger. Thus, the passenger is restrained with assurance and is protected against injury.

[Operation when a sudden pulling force acts upon the seat belt]

In this state the seat belt 3 is pulled suddenly, and therefore the reel shaft 4, locking gear 13, inertial body 14 and cam 17 attempt to turn suddenly in the seat belt pulling direction A. However, since the inertial body 14 is turnably supported on the locking gear 13 and the spring force of the control spring 15 is not that great, the control spring 15 is compressed and the inertial body 14 produces an inertial delay. More specifically, the inertial body 14 not only revolves along with the locking gear 13 in the seat belt pulling direction A but also rotates relative to the locking gear 13 in the B direction. Thus, the inertial body 14 constructs seat belt pull-out sensing means.

Owing to rotation of the inertial body 14, the locking pawl 14c moves to its engaging position and engages the teeth 18c, as indicated by the phantom lines in FIG. 2. As a consequence, the inertial body 14 is prevented from revolving, and the locking gear 13 and cam 17 are locked against rotation in the seat belt pulling direction A. Accordingly, only the reel shaft 4 rotates in the seat belt pulling direction A. By virtue of this operation, the locking gear 13 and cam 17 turn relative to the reel shaft 4 in the B direction, as mentioned earlier.

Owing to this relative rotation of the locking gear 13 and cam 17, the locking pins 19a, 19b, 19c move from their respective non-engaging positions shown in FIG. 12(a) to their respective engaging positions shown in FIG. 12(b) while being guided by the cam members 13j, 13k, 13m and the cam holes 17d, 17e, 17f, just as described above. Owing to this movement of the locking pins 19a, 19b, 19c to the engaging positions, the reel shaft 4 is prevented from turning in the seat belt turning direction A. As a result, it is possible to reliably prevent pull-out of the seat belt 3 caused by inertial forward lunging movement of the passenger. Thus, the passenger is restrained with assurance and is protected against injury.

The present invention is not limited to the foregoing embodiment but can be modified in various ways. For example, though three locking pins are provided in the foregoing embodiment, the present invention can be worked with a suitable number of locking pins of more than one. However, in view of strength and operating balance, it is preferred to adopt an arrangement in which a plurality of the locking pins are provided.

In addition, though the recesses 2f, 2g provided in the left and right side walls 2a, 2b of frame 2 are formed to be arcuate in shape, the recesses 2f, 2g can be formed to have any of a variety of shapes, such as a V-shaped configuration.

Furthermore, though the biasing means 5 in the foregoing embodiment is not provided with a comfort device, the present invention is applicable to a seat belt retractor provided with a comfort device.

Furthermore, in the foregoing embodiment, a case is described in which the present invention is applied to a seat belt retractor so adapted that tension is applied to the seat belt 3 by the biasing means. However, it goes without saying that the present invention can be applied also to a tensionless seat belt retractor.

Thus, in accordance with the seat belt retractor of the present invention, as should be evident from the foregoing description, a reel shaft is locked against rotation by engaging a locking pin with an engagement portion of a frame. Therefore, unlike the conventional locking means which relies upon meshing between teeth on a reel shaft and teeth on a frame, the reel shaft can be locked with certainty against rotation in the seat belt pulling direction, and reliability is enhanced as a result.

In addition, because engagement is achieved between the locking pin and the engagement portion of the frame, stress produced is much less in comparison with that developed owing to the conventional meshing between teeth. As a result, the retractor can be made small in size and light in weight as well.

Furthermore, since the locking pin alone moves without any movement whatsoever of the reel shaft, the mechanism is simplified and the parts are fewer in number so that assembly labor is reduced and cost lowered.

What is claimed is:

1. A seat belt retractor for use in a vehicle, comprising:
   a reel shaft for taking up a seat belt;
   a frame having side walls on opposite sides of said frame for freely rotatably supporting said reel shaft;
   locking means disposed between said frame and said reel shaft for allowing said reel shaft to turn when ordinary conditions prevail and for being actuated when necessary to lock said reel shaft against turning at least in a pulling direction of the seat belt;
   deceleration sensing means actuated when deceleration in excess of a predetermined value acts upon the vehicle; and
   lock actuating means for actuating said locking means in response to actuation of said deceleration sensing means, said locking means comprising:
   locking pins each having an outer circumferential surface and a substantially circular cross section, said locking pins having a length greater than a distance between said opposite side walls of said frame; and
   engagement grooves provided on said reel shaft, said engagement grooves extending along an axial direction of said reel shaft and being spaced with substantially equal distances therebetween around a periphery of said reel shaft, each engagement groove corresponding to one of said locking pins;
   a hole in both side walls of said frame, each hole having a predetermined number of recesses around the entire periphery thereof, said recesses around a hole in one side wall having shapes and positions matching shapes and positions of said recesses around the hole in the other side wall, said recesses of said holes engageable with respective ends of said locking pins;
   each locking pin being set at a non-engaging position at which it is remote from the recesses of the holes in the side walls of said frame, and at an engaging position at which each locking pin engages at each end thereof a respective recess of each hole in the side walls of said frame when said lock actuating means is actuated, said reel shaft being locked against turning at least in the pulling direction of the seat belt when said locking pins are set at the engaging position.

2. The seat belt retractor according to claim 1, further comprising seat belt pull-out sensing means actuated when the seat belt is pulled out at an acceleration in excess of a predetermined value, said lock actuating means being actuated also in response to actuation of said seat belt pull-out sensing means.

3. A seat belt retractor according to claim 1, further comprising:
   a lock gear for stopping rotation of said reel shaft when said deceleration sensing means is actuated, said lock gear arranged on one side of said reel shaft, and a cam engaging portion for engaging one end of each locking pin disposed in each respective groove of said reel shaft, said cam engaging portion mounted on said lock gear; and
   a cam having a cam hole engaged with the other end of each locking pin and which is disposed on a shaft end of the lock gear passing through and protruding from one side of said reel shaft to the other side of said reel shaft; and
   said lock actuating means guiding said cam engaging portion and each locking pin engaging with said cam to both said non-engaging position and said engaging position.

4. A seat belt retractor for use in a vehicle, comprising:
   a reel shaft for taking up a seat belt;
   a frame having side walls on opposite sides of said frame for freely rotatably supporting said reel shaft;
   locking means disposed between said frame and said reel shaft for allowing said reel shaft to turn when ordinary conditions prevail and for being actuated when necessary to lock said reel shaft against turning at least in a pulling direction of the seat belt;
   seat belt pull-out sensing means actuated when the seat belt is pulled out at an acceleration in excess of a predetermined value; and
   lock actuating means for actuating said locking means in response to actuation of said seat belt pull-out sensing means;
   said locking means comprising locking pins each having an outer circumferential surface and a substantially circular cross section, said locking pins having a length greater than a distance between said opposite side walls of said frame; and
   engagement grooves provided on said reel shaft, said engagement grooves extending along an axial direction of said reel shaft and being spaced with substantially equal distances therebetween around a periphery of said reel shaft, each engagement groove corresponding to one of said locking pins;
   a hole in both side walls of said frame, each hole having a predetermined number of recesses around the entire periphery thereof, said recesses around a hole in one side wall having shapes and positions matching shapes and positions of said recesses around the hole in the other side wall, said recesses of said holes engageable with respective ends of said locking pins;
   each locking pin being set at a non-engaging position at which it is remote from the recesses of the holes in the side walls of said frame, and at an engaging position at which each locking pin engages at each end thereof a respective recess of each hole in the side walls of said frame when said lock actuation means is actuated, said reel shaft being locked against turning at least in the pulling direction of the seat belt when said locking pins are set at the engaging position.

5. A seat belt retractor according to claim 4, wherein a lock gear for stopping rotation when said belt pull-out sensing means is actuated is arranged on one side of said reel shaft, and a cam engaging portion for engaging with one end of each locking pin in the grooves of said reel shaft and is disposed on said lock gear; and
   a cam having a cam hole engaged with the other end of each locking pin is disposed on a shaft end of the lock gear passing through and protruding from one side of said reel shaft to the other side of said reel shaft.

6. The seat belt retractor according to claims 1 or 4 wherein said recesses each having an arcuate shape.

7. The seat belt retractor according to claims 1 or 4, wherein each locking pin is positionable in a respective axially extending groove, and wherein
   each groove has a comparatively deep bottom portion and a comparatively shallow bottom portion, each deep bottom portion disposed relative to each respective shallow bottom portion in a direction of pull out of the seat belt; and
   wherein each locking pin is disposed in the comparatively deep bottom portion when in the non-engaging position, and is disposed in the comparatively shallow bottom portion when in the engaging position.

* * * * *